(12) United States Patent
Asakura et al.

(10) Patent No.: US 8,127,884 B2
(45) Date of Patent: Mar. 6, 2012

(54) ELECTRIC POWER STEERING APPARATUS

(75) Inventors: Toshihiro Asakura, Chiryu (JP);
Takashi Hara, Toyokawa (JP)

(73) Assignee: Jtekt Corporation, Osaka (JP)

( * ) Notice: Subject to any disclaimer, the term of this patent is extended or adjusted under 35 U.S.C. 154(b) by 262 days.

(21) Appl. No.: 12/695,731

(22) Filed: Jan. 28, 2010

(65) Prior Publication Data
US 2010/0200326 A1   Aug. 12, 2010

(30) Foreign Application Priority Data

Feb. 9, 2009 (JP) .................................. 2009-027687

(51) Int. Cl.
*B62D 5/04* (2006.01)
(52) U.S. Cl. ........................................ 180/444; 180/443
(58) Field of Classification Search .................. 180/444, 180/443
See application file for complete search history.

(56) References Cited

U.S. PATENT DOCUMENTS

| | | | | |
|---|---|---|---|---|
| 4,074,585 | A * | 2/1978 | Richaud et al. ............ 74/424.87 |
| 5,284,219 | A * | 2/1994 | Shimizu et al. ............... 180/444 |
| 5,467,661 | A * | 11/1995 | Lange .............................. 74/441 |
| 6,454,042 | B1 * | 9/2002 | Yoshida et al. ............... 180/444 |
| 6,464,034 | B1 * | 10/2002 | Toda et al. .................... 180/444 |
| 6,702,060 | B2 * | 3/2004 | Tatewaki et al. ............. 180/444 |
| 6,736,235 | B2 * | 5/2004 | Yoshida et al. ............... 180/444 |
| 7,219,761 | B2 * | 5/2007 | Fukuda et al. ................ 180/444 |
| 7,237,646 | B2 * | 7/2007 | Fukuda et al. ................ 180/444 |
| 7,413,051 | B2 * | 8/2008 | Okada ........................... 180/444 |
| 7,475,755 | B2 * | 1/2009 | Onishi et al. .................. 180/444 |
| 2002/0108803 | A1 * | 8/2002 | Toyofuku et al. ............. 180/443 |
| 2003/0019686 | A1 * | 1/2003 | Fukuda et al. ................ 180/444 |
| 2004/0245041 | A1 * | 12/2004 | Fukuda et al. ................ 180/444 |
| 2005/0133297 | A1 * | 6/2005 | Chikaraishi ................... 180/444 |
| 2005/0205342 | A1 * | 9/2005 | Tatewaki et al. .............. 180/444 |
| 2005/0217924 | A1 * | 10/2005 | Okada ........................... 180/444 |
| 2007/0227804 | A1 * | 10/2007 | Fukuda et al. ................ 180/444 |
| 2009/0294203 | A1 * | 12/2009 | Okada et al. .................. 180/444 |

FOREIGN PATENT DOCUMENTS

| | | |
|---|---|---|
| DE | 10 2007 024 328 A1 | 11/2008 |
| JP | A-2006-224938 | 8/2006 |
| JP | A-2006-256414 | 9/2006 |
| WO | WO 2006/013976 A1 | 2/2006 |

OTHER PUBLICATIONS

May 10, 2010 Search Report issued in European Patent Application No. 10152756.2.

* cited by examiner

*Primary Examiner* — Joanne Silbermann
*Assistant Examiner* — Michael Stabley
(74) *Attorney, Agent, or Firm* — Oliff & Berridge, PLC

(57) ABSTRACT

A flange member 20, which is formed as a separate body from a motor shaft 6, is screwed to an end 6a of the motor shaft 6. The flange member 20 functions as a flange 19 of the motor shaft 6. A flange 18, which is formed at an end 13a of a ball screw nut 13, is fastened to the flange 19 of the motor shaft 6. This couples the ball screw nut 13 to the motor shaft 6. A coupling member 27 is arranged in the joint portion between the ball screw nut 13 and the motor shaft 6. The coupling member 27 is formed by a tubular portion 28 and a plate flange 29, which extends radially outward from the outer circumferential surface of an end of the tubular portion 28. The tubular portion 28 of the coupling member 27 is fixed to the motor shaft 6, and the plate flange 29 is fixed to the flange member 20.

13 Claims, 8 Drawing Sheets

ELECTRIC POWER STEERING APPARATUS

CROSS-REFERENCE TO RELATED APPLICATIONS

This application is based upon and claims the benefit of priority from prior Japanese Patent Application No. 2009-027687, filed on Feb. 9, 2009, the entire contents of which are incorporated herein by reference.

BACKGROUND OF THE INVENTION

The present invention relates to an electric power steering apparatus having a ball screw device.

A conventional rack assist type electric power steering (EPS) apparatus includes a hollow shaft, a rack shaft passed through the hollow shaft, and a ball screw device serving as conversion means. When a motor is activated and rotates the hollow shaft, the ball screw device converts rotation of the hollow shaft into reciprocation of the rack shaft. The EPS apparatus thus applies assist force to a steering system.

In the EPS apparatus, the ball screw device has a helical raceway and a plurality of balls each serving as a roller body, which are accommodated in the raceway. The raceway is formed by arranging a threaded groove formed in the outer circumferential surface of the rack shaft and a threaded groove formed in an inner circumferential surface of a ball screw nut, facing each other. For example, in an EPS apparatus described in Japanese Laid-Open Patent Publication No. 2006-256414, a ball screw nut is fixed to an inner circumferential surface of a motor shaft configured as the aforementioned hollow shaft. When the ball screw nut rotates integrally with the motor shaft, the EPS apparatus converts torque produced by the motor shaft into an axial assist force and transmits the force to a rack shaft.

When the ball screw nut is fixed to the inner circumferential surface of the motor shaft, the ball screw nut is clamped by a locknut in an axial direction. However, the fixing structure that fastens the ball screw nut using the locknut may possibly deform the ball screw nut due to the pressing force produced by the locknut. If this causes distortion of the raceway, which is formed by a threaded groove formed in the ball screw nut, smooth rolling of balls may be hampered. Further, noise may be caused by the ball screw nut, and the steering feel may be deteriorated.

To solve this problem, the ball screw nut and the motor shaft may be fastened to each other by a method different from the above-described method. For example, as illustrated in FIG. 11, flanges 73, 74 each extending radially are formed at an end of the ball screw nut 71 and a corresponding end of a motor shaft 72. By fastening the flanges 73, 74 together, the ball screw nut 71 is fixed to the end of the motor shaft 72. This fixes the ball screw nut 71 to the motor shaft 72 in such a manner that the ball screw nut 71 is prohibited from rotating relative to the motor shaft 72, without deforming the ball screw nut 71.

In the rack assist type EPS apparatus configured as described above, the hollow shaft is mounted in a tubular housing by passing the hollow shaft through the housing in the axial direction. The hollow shaft is supported by a bearing arranged between the hollow shaft and the housing. The hollow shaft is thus rotatably received in the housing. Accordingly, if facilitation of the mounting of the hollow shaft is considered, it is desirable that a radially projecting body, such as the aforementioned flanges, be avoided as much as possible. Particularly, in the configuration in which the hollow shaft is formed by the motor shaft, as in the case of the EPS apparatus described in the aforementioned document, the motor shaft, which forms a rotor, is assembled with a stator mounted in the housing. In this case, since the clearance between the housing and the hollow shaft is extremely small, it is substantially impossible to form the flanges integrally with the hollow shaft.

To solve this problem, with reference to FIG. 12, a flange 74 for coupling the ball screw nut 71 may be formed as a flange member 75 independent from a motor shaft 72. In this case, after the motor shaft 72 is passed through the housing, the flange member 75 is coupled to the corresponding end of the motor shaft 72.

Specifically, in the example illustrated in FIG. 12, the flange member 75 has an annular portion 76 functioning as the flange 74 to which the above-described ball screw nut 71 is coupled. The annular portion 76 has an insertion hole 77 through which a rack shaft is inserted. An internal thread 78 is formed on the inner wall surface of the insertion hole 77. An external thread 79 corresponding to the internal thread 78 of the flange member 75 is formed on the outer circumferential surface of the corresponding end of the motor shaft 72. By screw engagement between the internal and external threads 78, 79, the flange member 75 is screwed to the motor shaft 72.

Typically, in an EPS apparatus, the rotating direction of the motor is switched frequently. Accordingly, if a clearance exists in a joint portion between the motor shaft 72 and the flange member 75 in a circumferential direction, the clearance causes chattering in rotation. This produces hitting sound each time the rotation of the motor is switched. However, the above-described fixing structure through screwing prevents the clearance from being created in the joint portion in the circumferential direction. This facilitates the installation of the motor without reducing the quietness.

However, in the structure fixing the flange member through screwing, switching of the rotating direction of the motor, which repeatedly occurs as has been described, produces loosening force that loosens the flange member. This makes it important to prevent such screw loosening of the flange member and, in this regard, the fixing structure has yet to be improved.

SUMMARY OF THE INVENTION

Accordingly, it is an objective of the present invention to provide an electric power steering apparatus that ensures high reliability by preventing loosening of a flange member screwed to a hollow shaft, which is rotated through actuation of a motor.

To achieve the foregoing objective and in accordance with one aspect of the present invention, an electric power steering apparatus including a hollow shaft, a flange member, a rack shaft, a ball screw device is provided. The hollow shaft is rotated through actuation of a motor, and has an end. The flange member is screwed to the end of the hollow shaft. The rack shaft is received in the hollow shaft in such a manner that the rack shaft is allowed to reciprocate in an axial direction, the rack shaft having an outer circumferential surface and a threaded groove formed in the outer circumferential surface. The ball screw device converts rotation of the hollow shaft into axial movement of the rack shaft. The ball screw device includes a ball screw nut, a helical raceway, and a plurality of balls. The ball screw nut is arranged around the threaded groove of the rack shaft. The ball screw nut has an inner circumferential surface and a threaded groove formed in the inner circumferential surface. The helical raceway is formed by arranging the threaded groove of the rack shaft and the threaded groove of the ball screw nut such that the grooves face each other. The balls are accommodated in the raceway. The ball screw nut has an end and a flange formed at the end. The ball screw nut is fixed to the hollow shaft by fastening the flange to the flange member. The electric power steering apparatus further includes a coupling member coupled to the ball screw nut and the hollow shaft. The coupling member has a tubular portion and a flange portion. The tubular portion is fixed to the hollow shaft and having an end. The flange portion extends radially outward from an end of the tubular portion and is fixed to the flange member.

In accordance with another aspect of the present invention, an electric power steering apparatus including a hollow shaft, a flange member, a rack shaft, and a ball screw device is provided. The hollow shaft is rotated through actuation of a motor, and has an end. The flange member is screwed to an end of the hollow shaft. The rack shaft is received in the hollow shaft in such a manner that the rack shaft is allowed to reciprocate in an axial direction. The rack shaft has an outer circumferential surface and a threaded groove formed in the outer circumferential surface. The ball screw device converts rotation of the hollow shaft into axial movement of the rack shaft. The ball screw shaft includes a ball screw nut, a helical raceway, and a plurality of balls. The ball screw nut is arranged around the threaded groove of the rack shaft. The ball screw nut has an inner circumferential surface and a threaded groove formed in the inner circumferential surface. The helical raceway is formed by arranging the threaded groove of the rack shaft and the threaded groove of the ball screw nut such that the grooves face each other. The balls are accommodated in the raceway. The ball screw nut has an end and a flange formed at the end. The ball screw nut is fixed to the hollow shaft by fastening the flange to the flange member. The electric power steering apparatus further includes a fastening member and a warning portion. The fastening member fastens the flange member to the ball screw nut. The warning portion is fixed to at least one of the hollow shaft and the flange member. The warning portion produces hitting noise by contacting the hollow shaft, the flange member, or the fastening member when the flange member and the hollow shaft are displaced relative to each other in a circumferential direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

Figure 1:
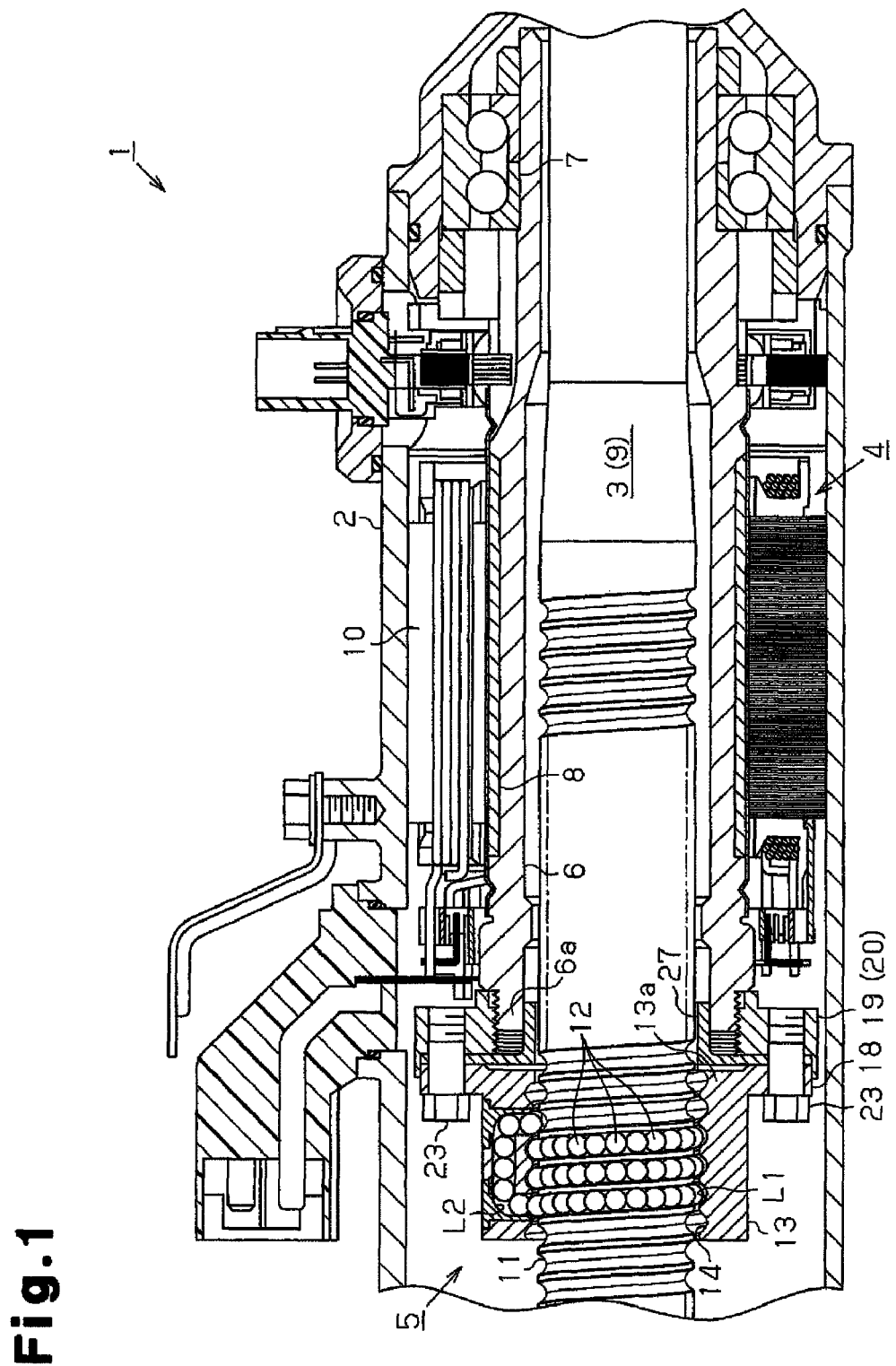
FIG. 1 is a cross-sectional view schematically showing an electric power steering (EPS) apparatus.

As shown in FIG. 1, an electric power steering (EPS) apparatus 1 of the present embodiment has a substantially cylindrical housing 2 and a rack shaft 3, which is received in the housing 2. The rack shaft 3 is supported by a rack guide and a sliding bearing (either not shown) in an axially movable manner. The rack shaft 3 is connected to a steering shaft (not shown) through a known rack and pinion mechanism. The rack shaft 3 is axially reciprocated through steering operation.

The EPS apparatus 1 has a motor 4 serving as a drive source and a ball screw device 5, which converts rotation of the motor 4 to axial movement of the rack shaft 3. The EPS apparatus 1 is configured as a rack assist type EPS apparatus, in which the rack shaft 3, the motor 4, and the ball screw device 5 are received in the housing 2 as an integral body.

Specifically, the motor 4 has a hollow motor shaft 6. The motor shaft 6 is arranged along the axial direction of the housing 2 and supported by a bearing 7, which is located on the inner circumferential surface of the housing 2. In the motor 4, magnets 8 are fixed to the outer circumferential surface of the motor shaft 6. The motor shaft 6 and the magnets 8 form a motor rotor 9. The motor 4 has a motor stator 10, which is arranged around the motor rotor 9. The motor stator 10 is fixed to the inner circumferential surface of the housing 2 and arranged coaxially with the rack shaft 3, which is passed through the motor shaft 6.

A threaded groove 11 is formed in the outer circumferential surface of the rack shaft 3. The rack shaft 3 is configured as a screw shaft. The ball screw device 5 includes a ball screw nut 13, which is engaged with the rack shaft 3 through a plurality of balls 12.

Figure 2:
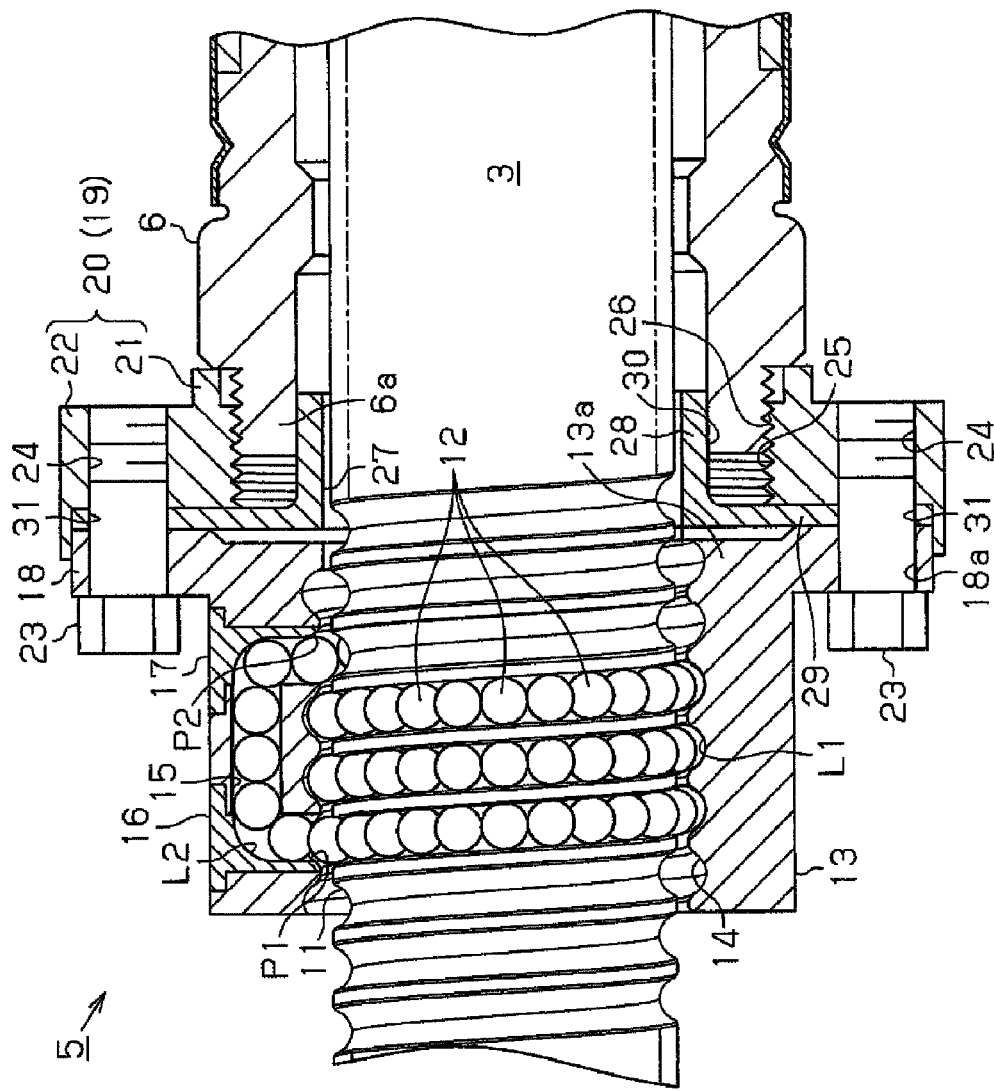
FIG. 2 is an enlarged cross-sectional view showing the vicinity of the ball screw device illustrated in FIG. 1.

More specifically, with reference to FIG. 2, a threaded groove 14 corresponding to the threaded groove 11 of the rack shaft 3 is formed in the inner circumferential surface of the ball screw nut 13, which has a substantially cylindrical shape. The ball screw nut 13 is secured to the rack shaft 3 in such a manner that the threaded groove 14 of the ball screw nut 13 faces the threaded groove 11 of the rack shaft 3. The two threaded grooves 11, 14 face each other in such a manner as to form a helical raceway L1. The balls 12 are received in the raceway L1.

The ball screw nut 13 has a return passage L2 having two openings (at joint points P1, P2) in the threaded groove 14. The return passage L2 has a return hole 15 and a pair of radial holes. The return hole 15 extends along the axis of the ball screw nut 13 in correspondence with the two joint points P1, P2. The radial holes extend from both ends of the return hole 15 to the corresponding joint points P1, P2. The radial holes are formed by deflector members 16, 17, which are embedded in the ball screw nut 13, and connect the return hole 15 and the raceway L1 to each other. The two openings of the raceway L1 are short circuited by the return passage L2 at the positions corresponding to the two joint points P1, P2.

In other words, when the ball screw nut 13 rotates relative to the rack shaft 3, the balls 12, which are arranged in the raceway L1 between the rack shaft 3 and the ball screw nut 13, roll along the raceway L1 while receiving load caused by rotation of the ball screw nut 13. After moving through the raceway L1, the balls 12 pass through the return passage L2, which is formed in the ball screw nut 13. In this manner, the balls 12 move from downstream to upstream between the two joint points P1, P2, which are located in the raceway L1. As the balls 12 roiling in the raceway L1 are circulated endlessly through the return passage L2, the ball screw device 5 is allowed to convert rotation of the ball screw nut 13 to axial movement of the rack shaft 3.

An annular plate-like flange 18, which projects in a radial direction, is formed at an end 13a of the ball screw nut 13. An annular plate-like flange 19 corresponding to the flange 18 of the ball screw nut 13 is formed at an end 6a of the motor shaft 6. When the flanges 18, 19 are fastened together, the ball screw nut 13 forming a rotation input portion of the ball screw device 5 and the motor shaft 6 serving as a motor output shaft are connected to each other.

Specifically, in the EPS apparatus 1 of the present embodiment, rotation of the motor 4 serving as the drive source is input to the ball screw device 5 through integral rotation of the ball screw nut 13, which is connected to the motor shaft 6 coaxially, and the motor shaft 6. The ball screw device 5 converts the rotation of the motor 4 into the axial movement of the rack shaft 3. In this manner, axial pressing force produced by the torque of the motor 4 is applied to the steering system as assist force.

Coupling Structure of Ball Screw Nut

A coupling structure of the ball screw nut 13 of the EPS apparatus 1 of the present embodiment will hereafter be explained.

Figure 3:
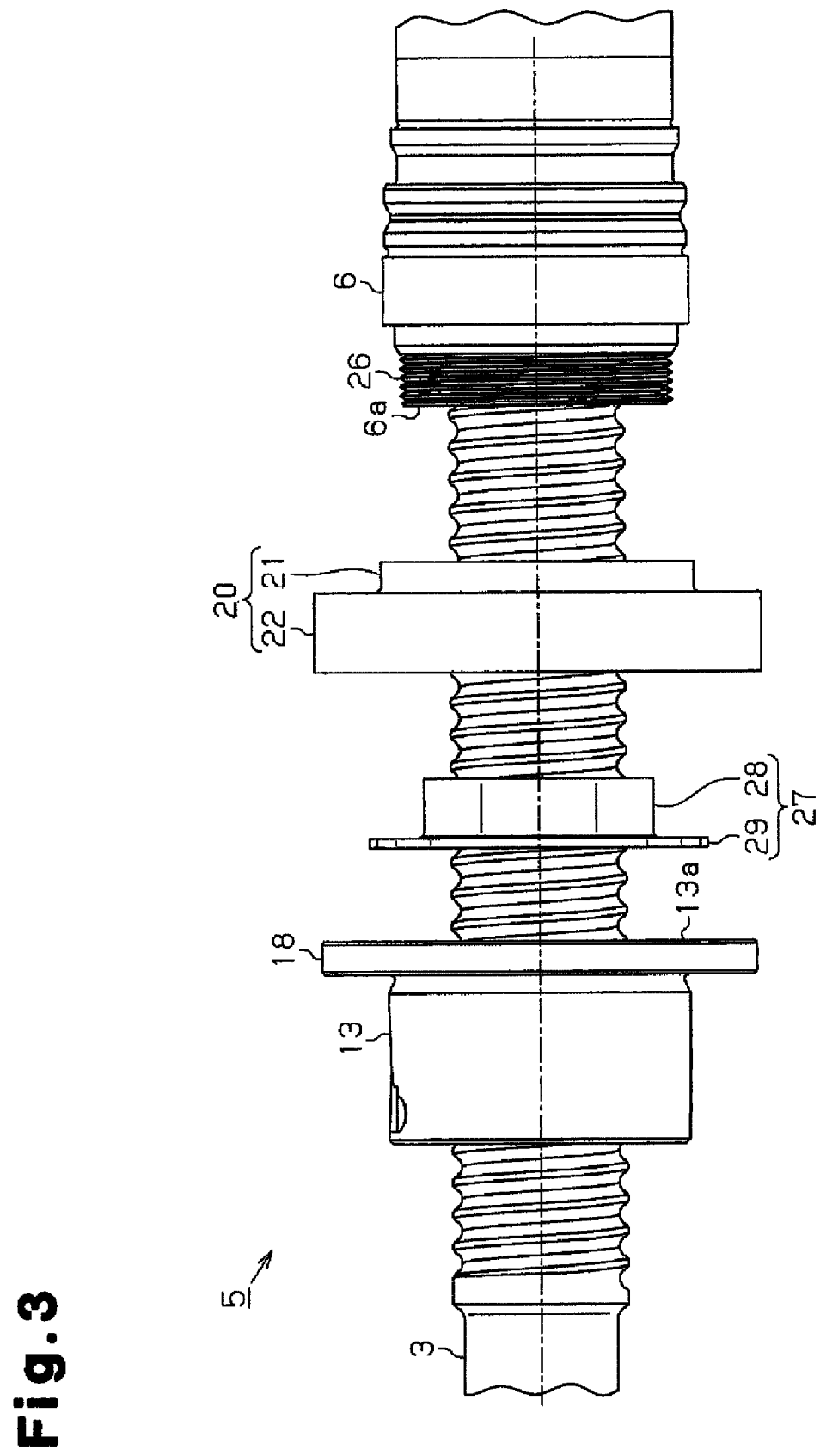
FIG. 3 is a diagram showing the ball screw device of FIG. 2 in an assembled state.
Figure 4:
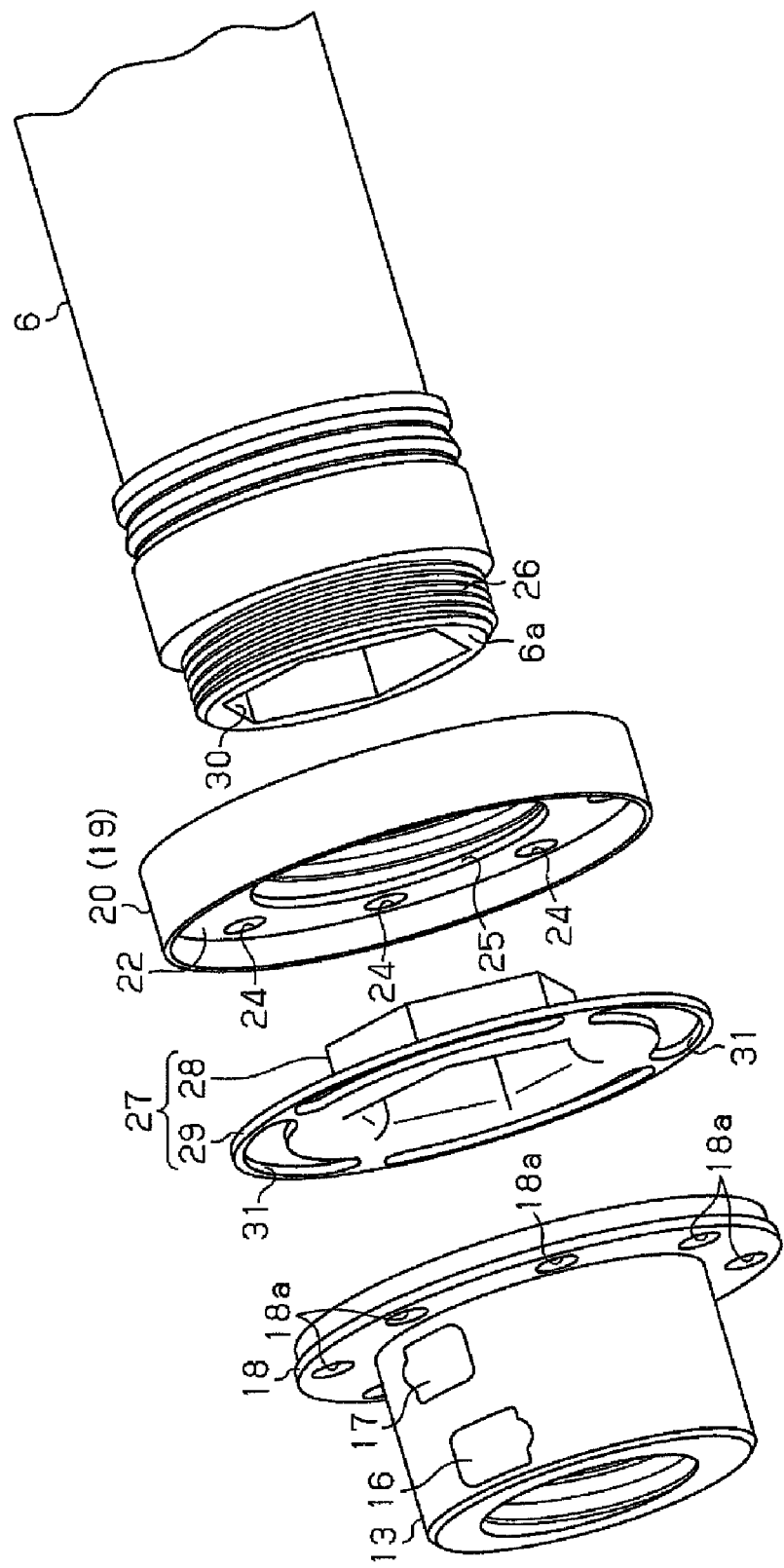
FIG. 4 is a perspective view showing the motor shaft, the flange member, the ball screw nut, and the coupling member illustrated in FIG. 3.

With reference to FIGS. 2 to 4, the flange 19 of the motor shaft 6 is formed by fixing a flange member 20, which is formed as a separate body from the motor shaft 6, to the end 6a of the motor shaft 6.

Specifically, the flange member 20 has a cylindrical short tubular portion 21 and an annular portion 22, which extends radially outward from the outer circumferential surface of the short tubular portion 21. A plurality of threaded holes 24, to which corresponding bolts 23 for fastening the ball screw nut 13 are screwed, are formed along the entire circumference of the annular portion 22. A plurality of insertion holes 18a corresponding to the threaded holes 24 are formed in the flange 18 of the ball screw nut 13. The bolts 23 are screwed to the threaded holes 24 through the insertion holes 18a. An internal thread 25 is formed in the inner circumferential surface of the short tubular portion 21. An external thread 26 corresponding to the internal thread 25 of the short tubular portion 21 is formed in the outer circumferential surface of the end 6a of the motor shaft 6.

Accordingly, by screw engagement between the internal thread 25 of the flange member 20 and the external thread 26 of the motor shaft 6, the flange member 20 is screwed to the end 6a of the motor shaft 6 in the axial direction. This causes the annular portion 22 of the flange member 20 to function as the flange 19 for fastening the ball screw nut 13. Also, the short tubular portion 21, which is arranged coaxially with the motor shaft 6, functions as an insertion hole (the inner surface of the short tubular portion 21) through which the rack shaft 3 is inserted.

A coupling member 27, which is designed for solving the problem of screw loosening that has been explained in BACKGROUND ART, is arranged between the flange 19 of the motor shaft 6 and the flange 18 of the ball screw nut 13.

Figure 5A:
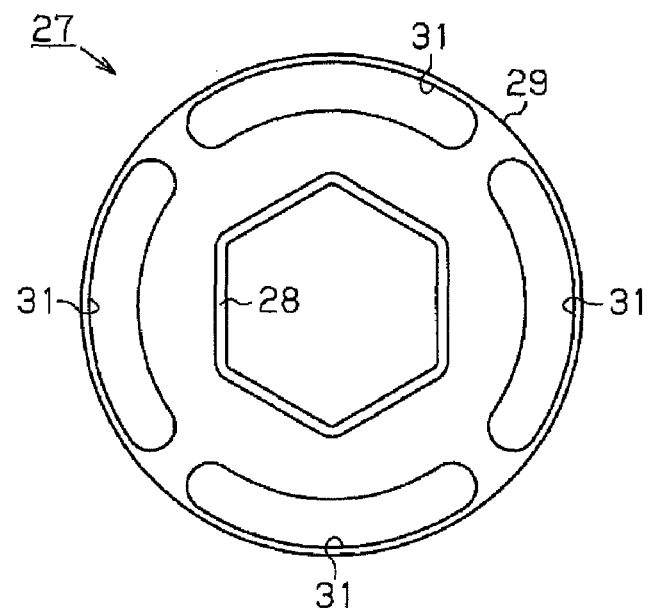
FIG. 5(a) is a plan view showing the coupling member of FIG. 4.
Figure 5B:
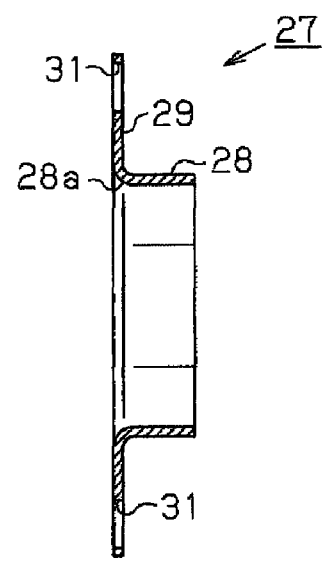
FIG. 5(b) is a cross-sectional view showing the coupling member of FIG. 5(a)

Specifically, as illustrated in FIGS. 5(a) and 5(b), the coupling member 27 has a tubular portion 28 and a plate flange 29 serving as a flange portion, which extends radially outward from an end 28a of the tubular portion 28. With reference to FIG. 2, the tubular portion 28 of the coupling member 27 is fixed to the motor shaft 6 and the plate flange 29 of the coupling member 27 is fixed to the flange member 20. This ensures firm fixation of the flange member 20 and the motor shaft 6 to each other.

More specifically, with reference to FIGS. 2 to 4, the tubular portion 28 of the coupling member 27 is fixed to the end 6a of the motor shaft 6 through the internal thread 25 of the short tubular portion 21, which serves as an insertion hole extending axially through the flange member 20.

Figure 6:
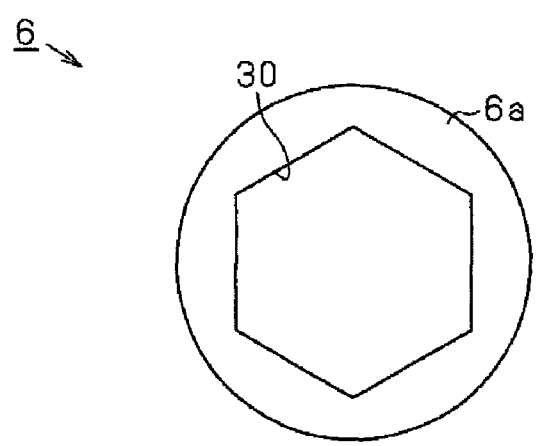
FIG. 6 is a plan view showing the motor shaft as viewed in the axial direction.

In other words, as illustrated in FIGS. 5(a) and 5(b), the tubular portion 28 of the coupling member 27 is shaped as a hexagonal tube. With reference to FIG. 6, the end 6a of the motor shaft 6 has a hexagonal hole 30 shaped in correspondence with the outline of the tubular portion 28. As illustrated in FIGS. 2 to 4, the tubular portion 28 of the coupling member 27 is passed through the short tubular portion 21 of the flange member 20 and received in the hexagonal hole 30 of the motor shaft 6. Fitting engagement between the tubular portion 28 and the hexagonal hole 30 restricts rotation of the coupling member 27 relative to the motor shaft 6.

When the tubular portion 28 is passed through the short tubular portion 21 of the flange member 20, the plate flange 29, which forms the coupling member 27 together with the tubular portion 28, is arranged coaxially with the annular portion 22 of the flange member 20. In this state, the plate flange 29 is located at a position (as viewed to the left in FIGS. 1 to 3) spaced from the motor shaft 6 compared to the flange member 20. The annular portion 22 of the flange member 20 forms the flange 19 for the motor shaft 6. When the flange 19 and the flange 18 of the ball screw nut 13 are fastened to each other, the plate flange 29 is clamped between the flanges 18, 19 and fixed to the flange member 20.

Specifically, as illustrated in FIGS. 5(a) and 5(b), the plate flange 29, which is shaped as an annular plate, has a plurality of (in the present embodiment, four) insertion holes 31 formed along a circumferential direction of the plate flange 29. The insertion holes 31 are elongated arcuate holes each extending in the circumferential direction. The insertion holes 31 are spaced apart at equal intervals in the circumferential direction of the plate flange 29. Each of the insertion holes 31 receives two of the bolts 23 for fastening the flanges 18, 19. In this manner, the fastening force produced by the bolts 23 fastens the plate flange 29 and the flanges 18, 19 to one another.

In other words, by fastening the flanges 18, 19 and the plate flange 29 together by means of the bolts 23 passed through the insertion holes 31, the plate flange 29 is fixed to the flange member 20 further firmly. By fitting the tubular portion 28 to the hexagonal hole 30 of the motor shaft 6 as has been described, the position of the coupling member 27 relative to the motor shaft 6 in the circumferential direction is determined. However, it is difficult to adjust the relative circumferential position of the flange member 20, which is fixedly screwed to the motor shaft 6, when the flange member 20 is in a fixed state. Accordingly, if each insertion hole 31 of the plate flange 29 has a typical circular shape, there may be cases in which the circumferential positions of the insertion holes 31 do not coincide with the circumferential positions of the threaded holes 24 of the annular portion 22. However, since the insertion holes 31 have the aforementioned elongated shapes, such a problem is avoided, so that the assembly is facilitated.

Further, since the coupling member 27 is fixed to both of the flange member 20 and the motor shaft 6, screw loosening of the flange member 20 is prevented to a significant extent. However, in order to further enhance the reliability of the EPS apparatus 1, it must be envision in advance that there may be cases in which even such firmly fixed flange member 20 becomes loose. Accordingly, it is desirable to provide a failsafe structure for these cases.

In this regard, the plate flange 29 is fixed to the annular portion 22 of the flange member 20 through the elongated insertion holes 31, as has been described. Accordingly, even when excessive force acts on the rack shaft 3 and damages any one of the bolts 23, the flange member 20 is prevented from being instantaneously released from the fixed state by the damaged one of the bolts 23.

That is, the plate flange 29 is clamped between the flange 18 of the ball screw nut 13 and the flange 19 for the motor shaft 6 by the fastening force of the flanges 18, 19. This fixes the plate flange 29 to the annular portion 22 of the flange member 20, which forms the flange 19 for the motor shaft 6. Accordingly, even when the excessive force acts on the rack shaft 3, the flange member 20 is displaced relative to the coupling member 27 in the circumferential direction, thus absorbing the excessive force. This prevents the bolts 23 from being damaged and thus stably maintains the fixed state of the flange member 20 and the plate flange 29.

Figure 7:
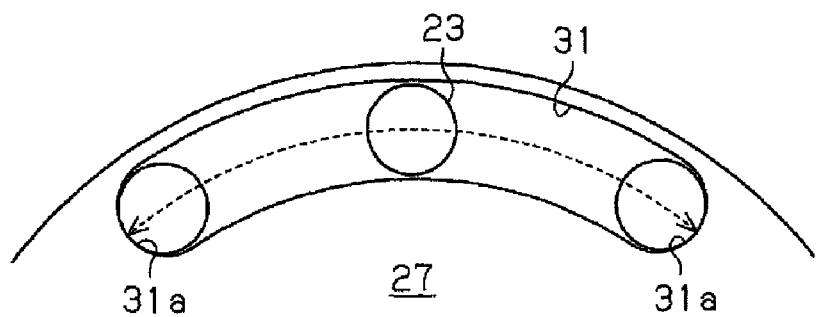
FIG. 7 is a diagram showing operation of an insertion hole functioning as a restricting portion and a warning portion in the coupling member illustrated in FIG. 5(a)

When fixation between the flange member 20 and the plate flange 29 is canceled, screw loosening may occur in the flange member 20 with respect to the motor shaft 6. In this case, with reference to FIG. 7, the flange member 20 and the motor shaft 6 move relative to each other in the circumferential direction. This moves the bolts 23, which are screwed to the threaded holes 24 of the flange member 20, in the corresponding arcuate insertion holes 31. The movement of each bolt 23 is restricted by a circumferential end 31a of the corresponding insertion hole 31. In this manner, further screw loosening of the flange member 20 is prevented. Also, using the hitting noise caused by contact between the bolt 23 and the ends 31a of the insertion hole 31, the driver is informed of the fact that screw loosening has occurred in the flange member 20. In this manner, the ends 31a of the insertion holes 31 function as a warning portion that operates through the sound, prompting the driver to repair the EPS apparatus 1 at such an early stage that the screw loosening does not affect the safety.

The present invention has the advantages described below.

(1) The flange member 20, which is formed as the separate body from the motor shaft 6, is screwed to the end 6a of the motor shaft 6. The flange member 20 functions as the flange 19 for the motor shaft 6. By fastening the flange 18, which is formed at the end 13a of the ball screw nut 13, to the flange 19 for the motor shaft 6, the ball screw nut 13 is connected to the motor shaft 6. The coupling member 27 is arranged in the joint portion between the motor shaft 6 and the ball screw nut 13. The coupling member 27 is formed by the tubular portion 28 and the plate flange 29, which extends radially outward from the outer circumferential surface of the end 28a of the tubular portion 28. The tubular portion 28 of the coupling member 27 is fixed to the motor shaft 6, and the plate flange 29 is fixed to the flange member 20.

In this configuration, the coupling member 27 restricts the displacement of the flange member 20 and the motor shaft 6 relative to each other in the circumferential direction. This ensures firm fixation between the flange member 20 and the motor shaft 6, thus preventing screw loosening of the flange member 20.

(2) The tubular portion 28 of the coupling member 27 is fixed to the end 6a of the motor shaft 6 through the internal thread 25 of the short tubular portion 21, which serves as the insertion hole extending axially through the flange member 20. In this manner, by arranging the coupling member 27 between the motor shaft 6 and the ball screw nut 13, the joint portion between the motor shaft 6 and the ball screw nut 13 is reinforced, while being prevented from enlarging in size.

(3) The plate flange 29 of the coupling member 27 is clamped between the flange 18 of the ball screw nut 13 and the flange 19 for the motor shaft 6 by the fastening force of the flanges 18, 19. This fixes the plate flange 29 to the annular portion 22 of the flange member 20, which forms the flange 19 for the motor shaft 6. In this manner, through such simple configuration, the plate flange 29 is easily fixed to the flange member 20.

(4) The plate flange 29 has the multiple insertion holes 31. Two of the bolts 23 are passed through the corresponding one of the insertion holes 31 and the flange 18 of the ball screw nut 13, the plate flange 29, and the flange 19 for the motor shaft 6 are fastened together. This configuration ensures further firm fixation of the plate flange 29 with respect to the flange member 20.

(5) Each of the insertion holes 31 is an elongated arcuate hole. Specifically, it is difficult to adjust the circumferential position of the flange member 20, which is fixedly screwed to the motor shaft 6, relative to the coupling member 27 when the flange member 20 is in a fixed state. However, since the insertion holes 31 are the elongated holes, the circumferential positions of the insertion holes 31 easily coincide with the circumferential positions of the threaded holes 24, which are formed in the annular portion 22 of the flange member 20. This facilitates the assembly.

If excessive force acts on the rack shaft 3, the bolts 23, which fix the plate flange 29 to the annular portion 22 of the flange member 20, move in the corresponding elongated insertion holes 31. This permits displacement of the plate flange 29 and the annular portion 22 relative to each other in the circumferential direction. Such circumferential displacement absorbs the excessive force acting on the rack shaft 3. As a result, fixation between the plate flange 29 and the annular portion 22 is prevented from being canceled instantaneously by damage occurred in any one of the bolts 23. The fixed state of the plate flange 29 is thus stably maintained.

When the fixation between the flange member 20 and the plate flange 29 is canceled, screw loosening is caused in the flange member 20, which is fixed to the motor shaft 6. Even in this case, the circumferential movement of the bolts 23 caused by the displacement of the flange member 20 and the motor shaft 6 relative to each other is restricted by the ends 31a of the corresponding insertion holes 31. This suppresses further screw loosening of the flange member 20.

Further, using the hitting noise produced by contact between the bolts 23 and the ends 31a of the corresponding insertion holes 31, the driver is informed of the fact that the screw loosening has occurred in the flange member 20. In this manner, the ends 31a of the insertion holes 31 function as the warning portion operating through the sound, prompting the driver to have the EPS apparatus 1 to be repaired at such an early stage that the screw loosening does not affect safety.

(6) The tubular portion 28 of the coupling member 27 is shaped as a hexagonal tube. The end 6a of the motor shaft 6 has the hexagonal hole 30 shaped in correspondence with the outline of the tubular portion 28. The tubular portion 28 is inserted through and fitted to the hexagonal hole 30 of the end 6a of the motor shaft 6. This fixes the tubular portion 28 to the motor shaft 6. In this configuration, the tubular portion 28 is reliably and easily fixed to the motor shaft 6 through such a simple structure.

The present embodiment may be modified as follows.

In the present embodiment, the plate flange 29 of the coupling member 27 is clamped between the flange 18 of the ball screw nut 13 and the flange 19 of the motor shaft 6 by the fastening force of the flanges 18, 19. This fixes the plate flange 29 to the annular portion 22 of the flange member 20. Instead, the plate flange 29 may be fixed to the annular portion 22 by any other suitable method, such as a method using adhesive. Alternatively, any other suitable fixation method may be used in combination with the aforementioned clamping method using the fastening force. This ensures further firm fixation between the plate flange 29 and the flange member 20.

In the present embodiment, the insertion holes 31 of the plate flange 29 may be omitted. In this case, the fixation between the plate flange 29 and the annular portion 22 of the flange member 20 using the fastening force of the bolts 23 is brought about simply by clamping the plate flange 29 between the flanges 18, 19 without passing the bolts 23 through the insertion holes 31.

Figure 8:
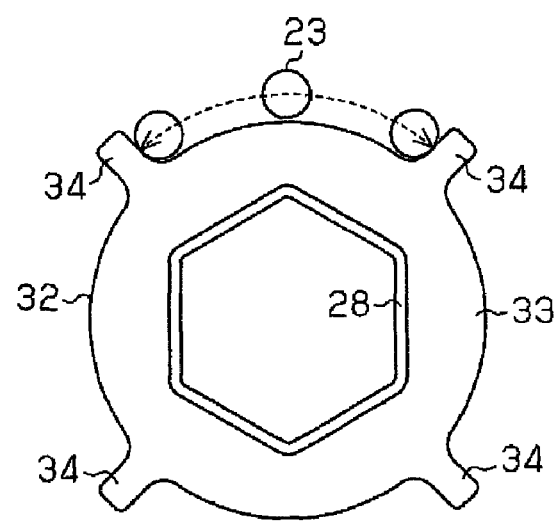
FIG. 8 is a diagram showing a coupling member of a modification functioning as a restricting portion and a warning portion.

In the embodiment described above, the end 31a of each insertion hole 31 is used as the restricting portion for restricting circumferential displacement of the plate flange 29 relative to the flange member 20, and the warning portion that warns the driver of screw loosening of the flange member 20 by means of the sound. Instead, for example, a coupling member 32, which is illustrated in FIG. 8, may function as the restricting portion and the warning portion. In this case, the restricting portion and the warning portion are provided without forming the insertion holes 31. That is, with reference to FIG. 8, a plate flange 33 has an outer diameter that is set in such a manner that the circumferential edge of the plate flange 33 is located radially inward from the positions at which the bolts 23 are screwed. For projections 34 project radially outward from the circumferential edge of the plate flange 33. When the plate flange 33 is displaced relative to the annular portion 22 of the flange member 20, the projections 34 each strike the corresponding bolt 23, thus functioning as the restricting portion and the warning portion. Alternatively, any suitable contact portions (projections or recesses) other than the bolts 23 may be formed in the flange member 20 in such a manner that the contact portions contact the corresponding projections 34.

Further, the insertion holes 31, if formed, do not necessarily have to be shaped as elongated holes. When the ends 31a of the insertion holes 31 each function as the restricting portion and the warning portion, the insertion holes 31 must be shaped in such a manner that the bolts 23 become movable circumferentially in the corresponding insertion holes 31.

In the embodiment described above, the tubular portion 28 of the coupling member 27 has a hexagonal tubular shape. The end 6a of the motor shaft 6 has the hexagonal hole 30 shaped in correspondence with the outline of the tubular portion 28. The tubular portion 28 is received in the hexagonal hole 30 of the motor shaft 6. The tubular portion 28 is thus fitted to the hexagonal hole 30, fixing the tubular portion 28 to the motor shaft 6. Instead, the tubular portion 28 may be shaped as any suitable polygonal tube (for example, a rectangular tube) other than the hexagonal tube. In this case, a receiving portion (for example, a rectangular hole) having a polygonal outline corresponding to the polygonal tubular shape of the tubular portion 28 is formed at the end 6a of the motor shaft 6.

As long as the polygonal receiving portion formed in the motor shaft 6 is capable of restricting the relative circumferential displacement of the tubular portion 28 when receiving the tubular portion 28, the number of the corners of the fitted portion does not necessarily have to be the same as the number of the corners of the tubular portion 28 of the coupling member 27.

Figure 9:
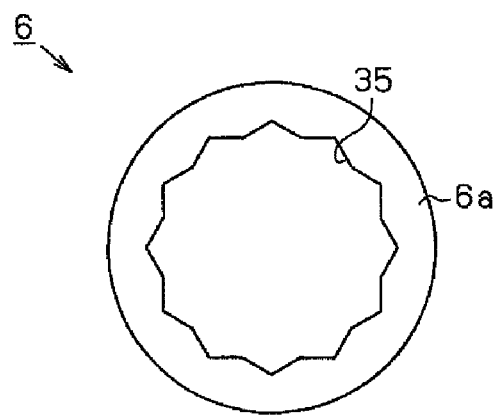
FIG. 9 is a plan view showing a motor shaft of a modification as viewed in the axial direction.

It is desirable that the corners of the receiving portion of the motor shaft 6 be provided by the number obtained by multiplying the number of the corners of the tubular portion 28 of the coupling member 27 by an integer number. Specifically, as illustrated in FIG. 9, for example, a dodecagonal hole 35 is formed as the receiving portion of the motor shaft 6, with respect to the tubular portion 28 shaped as the hexagonal tube. As has been described, it is difficult to adjust the relative circumferential position of the flange member 20, which is fixedly screwed to the motor shaft 6, when the flange member 20 is in the fixed state. Accordingly, there may be cases in which the threaded holes 24 of the annular portion 22 of the flange member 20 and the insertion holes 31 of the plate flange 29 of the coupling member 27, with which the corresponding bolts 23 are engaged, cannot be located at the mutually corresponding circumferential positions. However, the illustrated configuration increases the flexibility of setting the circumferential positions of the motor shaft 6 and the coupling member 27 relative to each other. The circumferential positions of the insertion holes 31 and the circumferential positions of the threaded holes 24 thus easily coincide. As a result, the assembly is further facilitated.

The tubular portion 28 of the coupling member 27 and the receiving portion of the motor shaft 6 may be fitted to each other by a form other than the fitting between the polygonal tubular portion, which is the tubular portion 28, and the corresponding polygonal fitted portion. That is, the tubular portion 28 and the fitted portion may be fitted each other, for example, through spline fitting or key coupling (fitting between an engagement projection formed in a fitted portion and an engagement recess provided in a receiving portion, which restricts circumferential displacement of the engaging portion and the engaged portion relative to each other). Alternatively, in this case, the tubular portion 28 of the coupling member 27 is not restricted to the polygonal tubular shape but may be shaped as a cylinder.

The tubular portion 28 of the coupling member 27 and the motor shaft 6 may be fixed to each other in any suitable form other than fitting. That is, the fixation between the tubular portion 28 and the motor shaft 6 may be brought about through pressing or swaging or using an engagement member radially extending through the tubular portion 28 and the motor shaft 6 (pinning).

Figure 10:
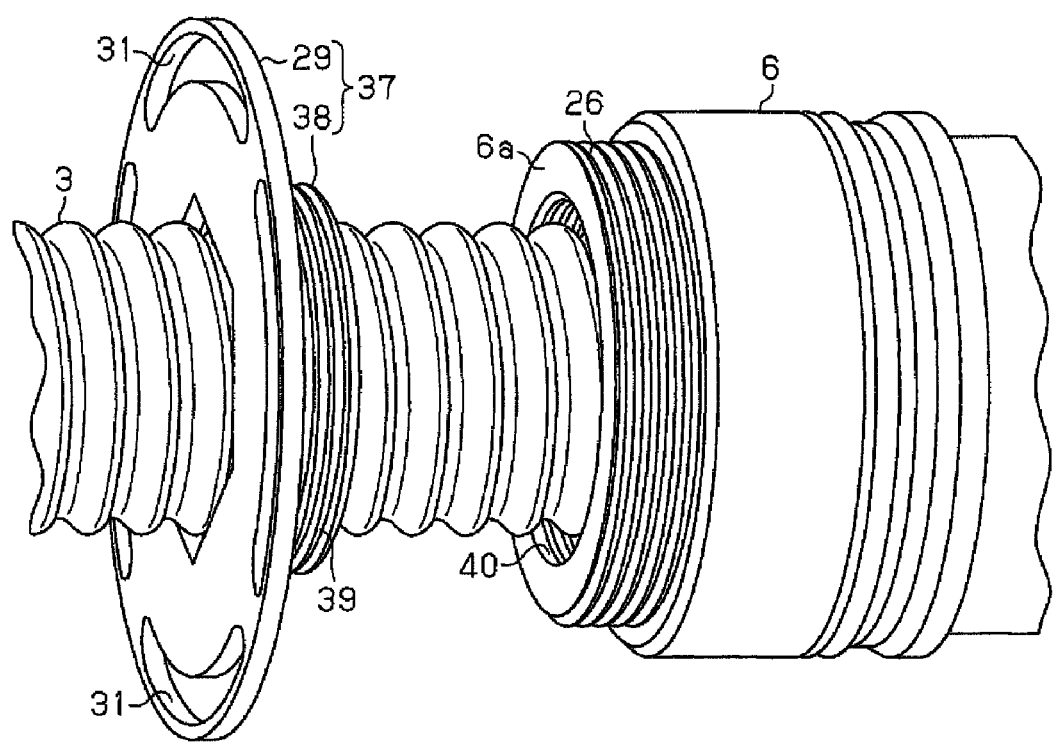
FIG. 10 is a diagram showing a coupling member of a modification and a method for fixing the coupling member.
Figure 11:
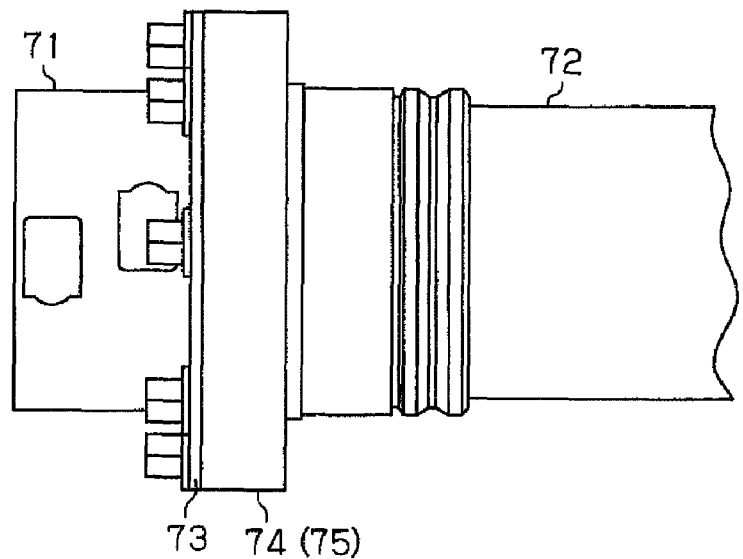
FIG. 11 is a side view showing a conventional fixing structure of a ball screw nut.
Figure 12:
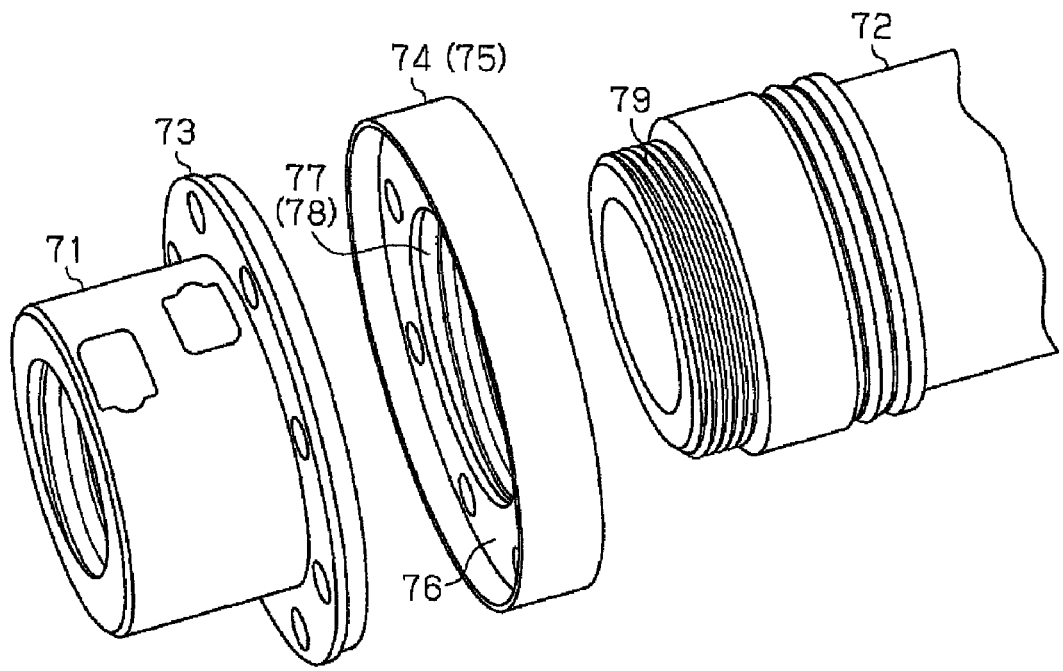
FIG. 12 is a perspective view showing the conventional fixing structure of the ball screw nut.

The tubular portion 28 of the coupling member 27 may be fixedly screwed to the motor shaft 6. Specifically, as illustrated in FIG. 10, for example, an external thread 39 is formed in the outer circumferential surface of a tubular portion 38 of a coupling member 37. An internal thread 40 is formed in the inner circumferential surface of the end 6a of the motor shaft 6. In FIG. 10, the flange member 20 is omitted for the illustrative purposes (of improving visibility of the internal thread 40 of the motor shaft 6). The coupling member 37 may be screwed to the end 6a of the motor shaft 6 by screw engagement between the threads 39, 40.

In this manner, the plate flange 29 of the coupling member 37 is pressed against and held in contact with the annular portion 22 of the flange member 20, which is fixed to the motor shaft 6, using the fastening force produced by screwing. This ensures firm fixation between the plate flange 29 and the annular portion 22. Further, the flange member 20 is fixed to the motor shaft 6 with enhanced firmness, and screw loosening of the flange member 20 is prevented.

In this case, it is desirable that the tubular portion 38 of the coupling member 37 be screwed to the motor shaft 6 in the direction opposite to the screwing direction of the flange member 20, that is, in the reverse screwing manner with respect to the flange member 20. In this configuration, if rotation of the motor shaft 6 produces force causing screw loosening in either one of the coupling member 37 and the flange member 20, fastening force acts on the other one of the coupling member 37 and the flange member 20. Accordingly, the flange member 20 is fixed to the motor shaft 6 with improved firmness, and screw loosening is prevented in the coupling member 37 and the flange member 20.

In the embodiment described above, the tubular portion 28 of the coupling member 27 is fixed to the inner circumferential surface of the end 6a of the motor shaft 6 through the internal thread 25 of the short tubular portion 21 of the flange member 20. Instead, the tubular portion 28 of the coupling member 27 may be fixed to the outer circumferential surface of the motor shaft 6 at the end 6a of the motor shaft 6. That is, the tubular portion 28 may be fitted to the end 6a of the motor shaft 6 from outside. In this case, the tubular portion 28 does not necessarily have to be received in the short tubular portion 21 of the flange member 20.

The plate flange 29 is fixed to the annular portion 22 of the flange member 20 at a position spaced from the motor shaft 6 (as viewed to the left in FIG. 3). However, the plate flange 29 may be fixed to the annular portion 22 of the flange member 20 at a position close to the motor shaft 6. Specifically, for example, the coupling member 27 is located at a position close to the motor shaft 6 compared to the flange member 20 (a position on the right as viewed in FIG. 3).

The coupling member 27 may function only as the warning portion. For example, the plate flange 29 of the coupling member 27 is neither fixed to the annular portion 22 of the flange member 20 nor clamped between the flanges 18, 19. The coupling member 27 and the flange member 20 are configured in such a manner as to produce hitting noise when relative displacement of the flange member 20 in the circumferential direction occurs. Specifically, any portion of the coupling member 27, such as the end 31a of each insertion hole 31, may contact any corresponding portion of each bolt 23 or the flange member 20 both serving as a fastening portion for fastening the flange member 20, thus producing the noise.

When the coupling member 27 functions simply as the warning portion as described above, a contact portion that produces hitting noise when the relative displacement of the flange member 20 in the circumferential direction occurs may be formed in the tubular portion 28 and the end 6a of the motor shaft 6. In other words, the coupling member 27 serving as the warning portion has to be fixed to at least one of the motor shaft 6, which is the hollow shaft, and the flange member 20. When the relative displacement of the flange member 20 in the circumferential direction occurs, a certain portion of the coupling member 27 must contact at least one of the motor shaft 6, the flange member 20, and any one of the bolts 23 serving as fastening members of the flange member 20, thus producing hitting noise.

In the embodiment described above, the present invention is embodied as a coaxial motor type EPS apparatus, in which the motor 4 and the rack shaft 3 are arranged coaxially. However, the invention is not restricted to any particular motor device. The invention may be embodied as any suitable type of EPS apparatus, as long as the EPS apparatus is a rack assist type having a hollow shaft driven by a motor in which a ball screw nut and the hollow shaft are connected to each other by fastening a flange formed at an end of the ball screw nut and a flange member screwed to an end of the hollow shaft to each other. The invention may be used in, for example, a parallel type EPS apparatus in which a motor and a rack shaft are arranged parallel with each other or a rack cross type EPS apparatus in which the motor axis diagonally crosses the rack shaft.

Therefore, the present examples and embodiments are to be considered as illustrative and not restrictive and the invention is not to be limited to the details given herein, but may be modified within the scope and equivalence of the appended claims.

What is claimed is:

1. An electric power steering apparatus comprising:
a hollow shaft that is rotated through actuation of a motor, the hollow shaft having an end;
a flange member screwed to the end of the hollow shaft;
a rack shaft received in the hollow shaft in such a manner that the rack shaft is allowed to reciprocate in an axial direction, the rack shaft having an outer circumferential surface and a threaded groove formed in the outer circumferential surface; and
a ball screw device that converts rotation of the hollow shaft into axial movement of the rack shaft, the ball screw device including:
a ball screw nut arranged around the threaded groove of the rack shaft, the ball screw nut having an inner circumferential surface and a threaded groove formed in the inner circumferential surface;
a helical raceway formed by arranging the threaded groove of the rack shaft and the threaded groove of the ball screw nut such that the grooves face each other; and
a plurality of balls accommodated in the raceway,
wherein the ball screw nut has an end and a flange formed at the end, the ball screw nut being fixed to the hollow shaft by fastening the flange to the flange member,
the electric power steering apparatus further including a coupling member coupled to the ball screw nut and the hollow shaft,
wherein the coupling member has a tubular portion and a flange portion, the tubular portion being fixed to the hollow shaft and having an end, and the flange portion extending radially outward from the end of the tubular portion and being fixed to the flange member.

2. The electric power steering apparatus according to claim 1, wherein the flange member has an insertion hole that extends axially and through the flange member, and wherein the tubular portion of the coupling member is fixed to an inner surface of the hollow shaft through the insertion hole.

3. The electric power steering apparatus according to claim 2, wherein the flange portion of the coupling member is clamped between the flange of the ball screw nut and the flange member.

4. The electric power steering apparatus according to claim 3, wherein the flange portion of the coupling member has one or more bolt insertion holes, a bolt for fastening the flange of the ball screw nut and the flange member to each other being passed through each of the bolt insertion holes.

5. The electric power steering apparatus according to claim 4, wherein each bolt insertion hole is an elongated arcuate hole extending in a circumferential direction.

6. The electric power steering apparatus according to claim 1, further comprising a fastening member that fastens the flange member to the ball screw nut,
wherein a restricting portion is formed in the flange portion of the coupling member, the restricting portion restricting displacement of the flange member and the hollow shaft relative to each other in the circumferential direction by contacting the flange member or the fastening member when the displacement occurs.

7. The electric power steering apparatus according to claim 1, further comprising a fastening member that fastens the flange member to the ball screw nut,
wherein a warning portion is formed in the flange portion of the coupling member, the warning portion producing hitting noise by contacting the flange member or the fastening member when the flange member and the hollow shaft are displaced relative to each other in the circumferential direction.

8. The electric power steering apparatus according to claim 1, wherein the tubular portion of the coupling member is fixed to the hollow shaft through fitting.

9. The electric power steering apparatus according to claim 8, wherein the tubular portion of the coupling member is formed as a polygonal tube and the hollow shaft has a receiving portion having a polygonal shape corresponding to the number of the corners of the tubular portion.

10. The electric power steering apparatus according to claim 9, wherein the number of the corners of the receiving portion of the hollow shaft is obtained by multiplying the number of the corners of the tubular portion of the coupling member by an integer number.

11. The electric power steering apparatus according to claim 1, wherein the tubular portion of the coupling member is fixed to the hollow shaft through screwing.

12. The electric power steering apparatus according to claim 11, wherein the tubular portion of the coupling member is screwed to the hollow shaft in a reverse direction with respect to the screwing direction of the flange member.

13. An electric power steering apparatus comprising:
a hollow shaft that is rotated through actuation of a motor, the hollow shaft having an end;
a flange member screwed to the end of the hollow shaft;
a rack shaft received in the hollow shaft in such a manner that the rack shaft is allowed to reciprocate in an axial direction, the rack shaft having an outer circumferential surface and a threaded groove formed in the outer circumferential surface; and
a ball screw device that converts rotation of the hollow shaft into axial movement of the rack shaft, the ball screw device including:
a ball screw nut arranged around the threaded groove of the rack shaft, the ball screw nut having an inner circumferential surface and a threaded groove formed in the inner circumferential surface;
a helical raceway formed by arranging the threaded groove of the rack shaft and the threaded groove of the ball screw nut such that the grooves face each other; and
a plurality of balls accommodated in the raceway,
wherein the ball screw nut has an end and a flange formed at the end, the ball screw nut being fixed to the hollow shaft by fastening the flange to the flange member,
the electric power steering apparatus further including:
a fastening member that fastens the flange member to the ball screw nut; and
a warning portion that is fixed to at least one of the hollow shaft and the flange member, the warning portion producing hitting noise by contacting the hollow shaft, the flange member, or the fastening member when the flange member and the hollow shaft are displaced relative to each other in a circumferential direction.

* * * * *